(12) United States Patent
Ng et al.

(10) Patent No.: US 10,277,713 B2
(45) Date of Patent: Apr. 30, 2019

(54) ROLE-BASED ACCESS TO SHARED RESOURCES

(71) Applicant: Cisco Technology, Inc., San Jose, CA (US)

(72) Inventors: Mark Ka Yau Ng, Fremont, CA (US); Max Freilich, Milpitas, CA (US); Tak Cheung Lam, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 246 days.

(21) Appl. No.: 14/798,863

(22) Filed: Jul. 14, 2015

(65) Prior Publication Data

US 2017/0019498 A1 Jan. 19, 2017

(51) Int. Cl.
*G06F 15/16* (2006.01)
*H04L 29/08* (2006.01)
*H04L 29/06* (2006.01)

(52) U.S. Cl.
CPC .......... *H04L 67/327* (2013.01); *H04L 63/105* (2013.01); *H04L 67/10* (2013.01); *H04L 63/02* (2013.01)

(58) Field of Classification Search
CPC ... H04L 41/0893; H04L 63/105; H04L 63/10; H04W 12/06; H04W 12/08
USPC ..... 709/223, 224, 225, 229, 217; 726/1, 2, 4
See application file for complete search history.

(56) References Cited

U.S. PATENT DOCUMENTS

| 6,754,621 | B1* | 6/2004 | Cunningham | ......... G06Q 40/04 704/219 |
| 7,395,341 | B2 | 7/2008 | Nicodemus et al. | |
| 7,437,755 | B2 | 10/2008 | Farino et al. | |
| 8,438,270 | B2 | 5/2013 | Nappier et al. | |
| 8,675,601 | B2 | 3/2014 | Calhoun et al. | |
| 9,087,189 | B1* | 7/2015 | Koeten | ................... H04L 67/10 |
| 2003/0087629 | A1* | 5/2003 | Juitt | ......................... H04L 1/22 455/411 |
| 2003/0126243 | A1* | 7/2003 | Kudo | ............... H04L 29/12254 709/222 |
| 2007/0271453 | A1 | 11/2007 | Pohja et al. | |
| 2008/0235755 | A1* | 9/2008 | Blaisdell | ............. H04L 63/0227 726/1 |
| 2010/0061386 | A1* | 3/2010 | Olsson | .................. H04W 76/11 370/401 |

(Continued)

*Primary Examiner* — Dhairya A Patel
(74) *Attorney, Agent, or Firm* — Edell, Shapiro & Finnan, LLC (57) ABSTRACT

Information identifying a user as having accessed a first network device from an external network connected device is received at an intermediate network connected device from an edge network device. The intermediate network connected device is arranged between the first network device and a second network device. The intermediate network connected device, the first network device and the second network device are within the network and the external network connected device is outside the network. A request to access the second network device is received at the intermediate network connected device from the first network device. It is determined that the user is a source of the request via the first network device based upon the received information. The request from the first network device is evaluated based upon determining the user is the source of the request.

20 Claims, 4 Drawing Sheets

(56) References Cited

U.S. PATENT DOCUMENTS

| | | | |
|---|---|---|---|
| 2011/0106709 A1* | 5/2011 | Puura | G06Q 20/20 705/64 |
| 2011/0113467 A1* | 5/2011 | Agarwal | G06F 21/6281 726/1 |
| 2012/0096271 A1* | 4/2012 | Ramarathinam | H04L 63/0807 713/172 |
| 2012/0197852 A1* | 8/2012 | Dutta | H04L 67/2804 707/692 |
| 2013/0133023 A1 | 5/2013 | Burstein et al. | |
| 2013/0332982 A1* | 12/2013 | Rao | H04L 63/08 726/1 |
| 2014/0282816 A1* | 9/2014 | Xie | H04L 63/0227 726/1 |

\* cited by examiner

ROLE-BASED ACCESS TO SHARED RESOURCES

TECHNICAL FIELD

The present disclosure relates to network security, and in particular, to providing role-based access to shared resources within a network environment.

BACKGROUND

Access control in computer networks generally involves a group of devices from an outside network (outsider devices), a group of devices from an inside network (insider devices), and an access control gateway sitting in between the outside network and inside network to determine which outsider devices can access which insider devices, and vice versa. Access control is role-based if the access control decision is based on the user identity instead of the identity of the device itself, where the user identity can represent the user itself, a membership or group the user belongs to, or other postures that characterize the user using the device.

For remote access, role-based access also involves a group of users who can remotely control the insider device from the outsider device via the access control gateway as if they are controlling the insider device directly from the inside network. Typical examples for the remote access scenarios above include, but are not limited to, virtual network computing and virtual desktop infrastructure, which have become more and more popular in data center deployments.

DESCRIPTION OF EXAMPLE EMBODIMENTS

Overview

Information identifying a user as having accessed a first network device from an external network connected device is received at an intermediate network connected device from an edge network device. The intermediate network connected device is arranged between the first network device and a second network device. The intermediate network connected device, the first network device and the second network device are within a network and the external network connected device is outside the network. A request to access the second network device is received at the intermediate network connected device from the first network device. It is determined that the user is a source of the request via the first network device based upon the received information. The request from the first network device is evaluated based upon determining the user is the source of the request.

Example Embodiments

Figure 1:
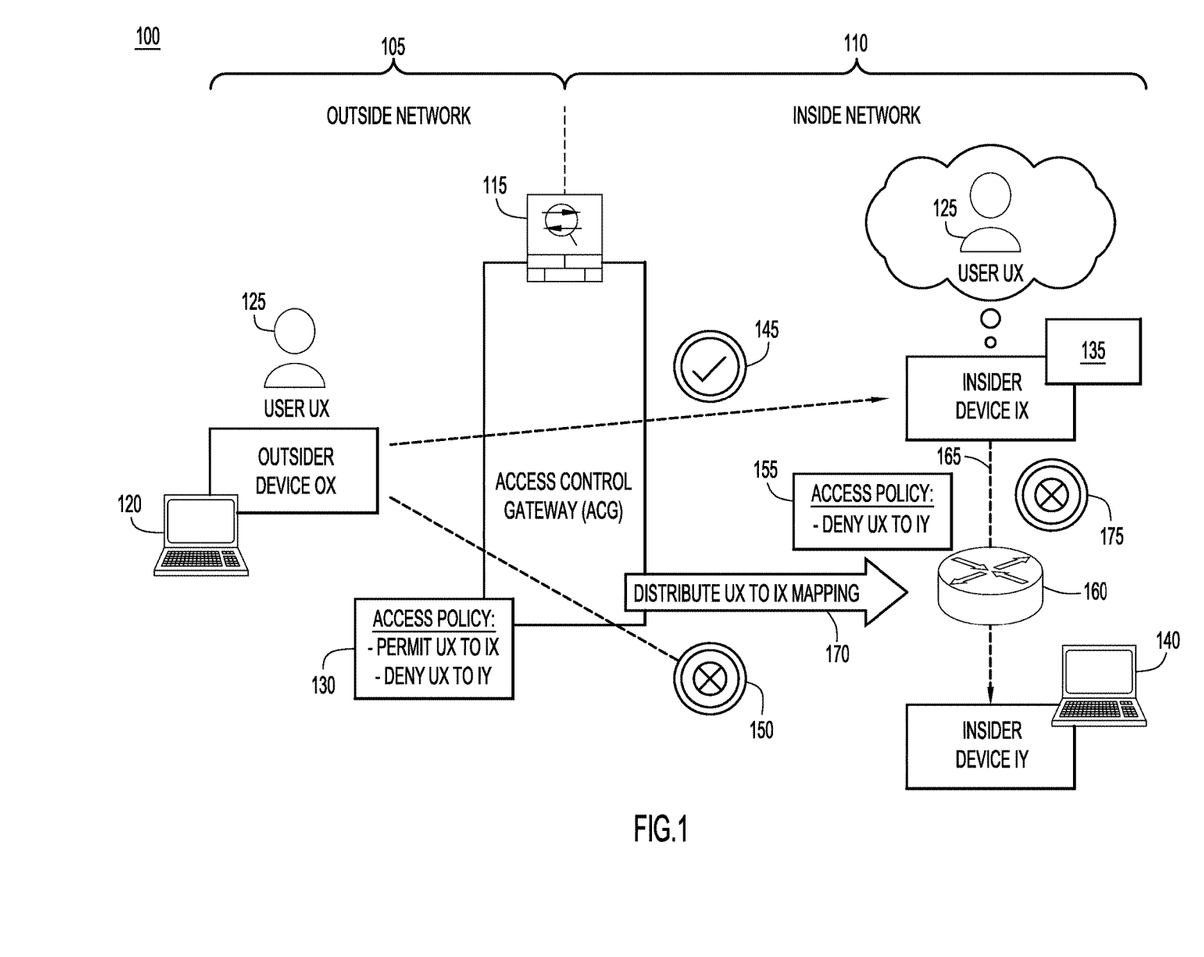
FIG. 1 illustrates a network environment configured to perform role-based access for shared resources, according to an example embodiment.

With reference now made to FIG. 1, depicted therein is a network environment 100 configured to provide identity distribution to control indirect path role-based access to shared resources. In other words, network environment 100 is configured to provide role-base security to network traffic that may not identify the user or role that is the source of the traffic.

Network environment 100 is divided into devices which are on an outside network 105 of network environment 100 and devices which are on an inside network 110 of network environment 100. Devices on the outside network 105 initially access inside network 110 through an access point. The access point illustrated in FIG. 1 is access control gateway (ACG) 115, though other example embodiments may utilizes additional or different access points, such as wireless access points. ACG 115 stores policies and controls access to devices on the inside network 110 of network environment 100. For example, network connected device 120 may be utilized by user 125 to access one or more of the networked connected devices located on inside network 110 of network environment 100. User 125 via network connected device 120 will access the networked connected devices on the inside network 110 through ACG 115. In order to determine whether or not user 125 should be granted access to a device on inside network 110, ACG 115 stores policy 130 in its memory.

According to the example of FIG. 1, policy 130 permits user 125 to access a first device 135 that is on inside network 110 of network environment 100. First device 135 may be, for example, a virtual machine including a desktop environment such as a remote desktop virtual machine, though other network devices are also included in the techniques described in the present disclosure. Policy 130 also indicates that user 125 should not be permitted to access a second network connected device 140 on inside network 110. Second device 140 may also be embodied as a virtual machine, though other network devices are also included in the techniques described in the present disclosure. Accordingly, when user 125 tries to access first device 135, user 125 and network connected device 120 are granted access to first device 135 through ACG decision 145 based upon policy 130. On the other hand, when user 125 attempts to directly access second device 140 through network connected device 120, ACG 115 blocks the access attempt through decision 150, also in response to policy 130. In other words, when user 125 attempts to access devices from outside network 105 of network environment 100, policy 130 can be correctly applied to the user 125 as user 125 must access inside network 110 through ACG 115. When user 125 attempts to access a device directly from user device 120, the access attempts are considered "direct" access attempts, and can be addressed by ACG 115.

Once user 125 accesses first device 135, user 125 may utilize first device 135 to attempt to access second device 140. An access attempt from first device 135 is considered an "indirect" access attempt as user 125 is attempting to access second device 140 from a device other than user device 120. In other words, this access attempt is "indirect" because it is coming from a network device in inside network 110 under the control of a user at a device on outside network 105. As policy 130 indicates that user 125 is not permitted to access second device 140, this access should be blocked. In order to enforce policy 130 on first device 135, policy 155 may be stored and implemented at intermediate device 160. For example, intermediate device 160 may be embodied as a switch, a router, a firewall, or another network device that may be configured to implement security policies and/or access policies like policies 130 and 155. If intermediate device 160 attempts to implement policy 155 (or policy 130), the policy alone may be insufficient to determine whether or not the access requested by first device 135 should be granted.

Specifically, first device 135 may send access request 165 to second device 140. Access request 165 may not include an indication that first device 135 is being accessed by user 125. For example, if first device 135 is embodied as a virtual desktop virtual machine, the user identified in access request 165, if a user is identified at all, may be a generic virtual desktop user, not user 125. Accordingly, even though policy 155 is present at intermediate device 160, the policy will not be applied to request 165 because intermediate device 160 is unaware that user 125 is currently accessing first device 135. In order to protect against this possibility, ACG 115 will send a mapping 170 to intermediate device 160.

Mapping 170 is a message sent from ACG 115 to intermediate device 160 that allows intermediate device 160 to determine that granting access request message 165 would be providing access to second device 140 to user 125. According to the example of FIG. 1, mapping 170 is a simple message that when processed by intermediate device 160 allows intermediate device 160 to determine that messages sent from first device 135 are associated with user 125. The mapping information indicated in mapping 170 may be stored in memory (e.g., in a database) in intermediate device 160. Using the combination of policy 155 and mapping 170, intermediate device 160 can correctly deny access request 165 through determination 175.

In order to distribute mapping 170, ACG 115 may maintain a database for the mappings between users, user devices, such as user device 120 in the outside 105 network 105, and network connected devices on the inside network 110, such as first network connected device 135 and second network connected device 140. By distributing mapping 170 that indicates that user 125 has accessed first network connected device 135, role-based access policies, such as policies 130 and 155, can be written and applied to network environment 100, even when the traffic may not indicate that user 125 is ultimately the source of the traffic. Accordingly, when traffic is generated from first network connected device 135 to second network connected device 140, the network components in between them (i.e., intermediate device 160) can map first network connected device 135 to user 125, and hence decide whether user 125 is allowed to access second network connected device 140.

Mapping 170 may be a mapping that uniquely identifies user 125 as being associated with first device 135. According to other examples, in which role or user-group based access or security is implemented in network environment 100, mapping 170 may map a particular user group to first device 135. For example, if user 125 has administrative privileges, mapping 170 may indicate that a generic member of the "administrator" group is accessing first device 135. If, on the other hand, user 125 is an untrusted guest, mapping 170 may indicate that a generic member of the "guest" group has accessed first device 135. Similarly, policies 130 and 155 may be written to apply based on particular users or based on groups of users or "roles" with particular access rights. Accordingly, "user" as used herein may refer to a particular user or a particular group of users.

While FIG. 1 illustrates mapping 170 as being distributed to a single intermediate device 160 in inside network 110, mapping 170 may be distributed to any device within inside network 110 that is capable or configured to apply role based network security. Through the distribution of mapping 170, network environment 100, and inside network 110 in particular, may implement role-based access control at any point of network environment 100. This allows for a more secure environment in which "indirect" path attacks can be protected against, including the remote access scenarios where the user can easily hide its identity by remotely controlling a device inside ACG 115. Accordingly, the system of inside network 110 may address security holes present in conventional networks. In other words, ACG 115 and the network components such as intermediate network device 160 cooperate so that any blind spot coming from an "indirect" path can be eliminated.

Figure 2:
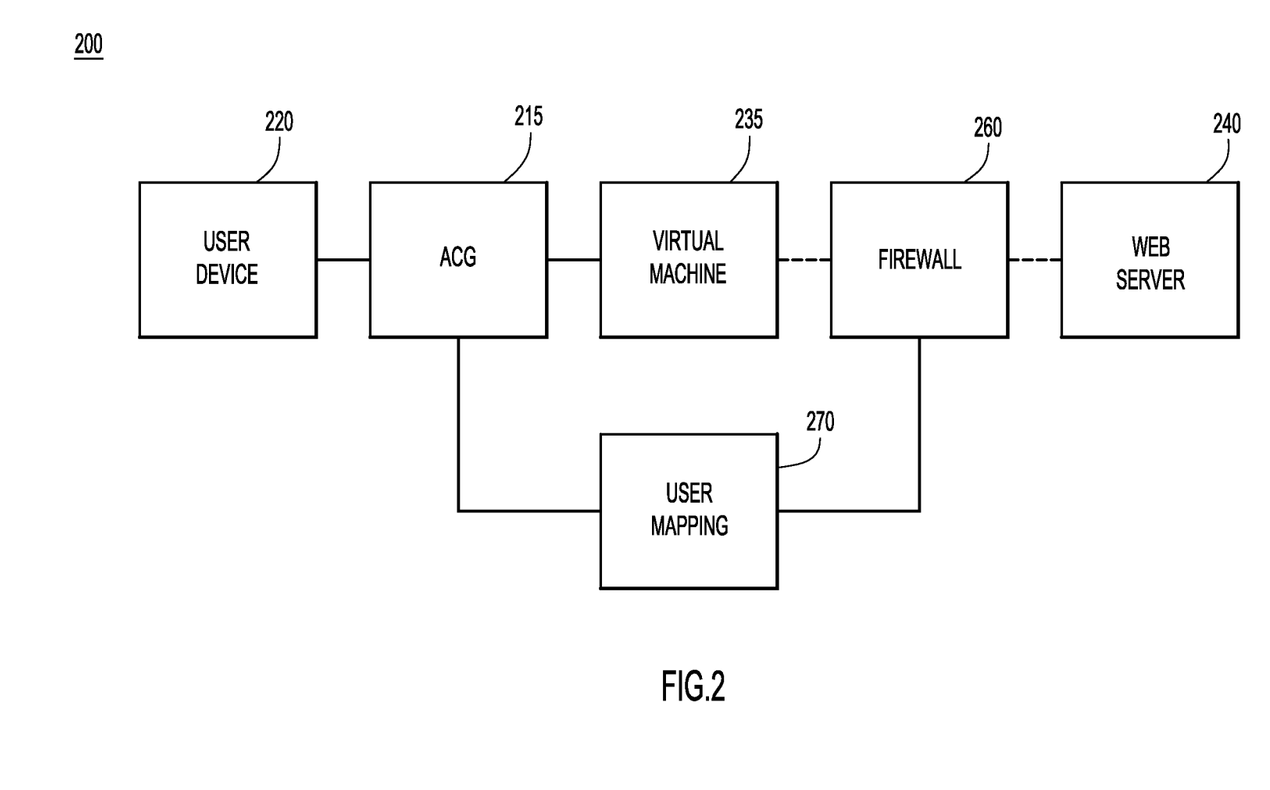
FIG. 2 illustrates a second network environment configured to perform role-based access for shared resources, according to an example embodiment.

With reference now made to FIG. 2, depicted therein is a logical arrangement of another network environment 200 configured to provide identity distribution to control indirect path role-based access to shared resources. ACG 215 of FIG. 2 serves as a gateway for network 200, and therefore, stores role based policies for traffic passing from user devices, such as user device 220, to devices inside network 200, such as virtual desktop virtual machine 235. Because virtual machine 235 is a virtual desktop virtual machine, the communications from user device 220, passing through ACG 215, to virtual machine 235 are sent according to the remote desktop protocol, as illustrated by the solid line between user device 220, ACG 215, and virtual machine 235. Remote desktop protocol messages may include or be tagged with the identity of the user accessing user device 220, and therefore, ACG 215 can apply role-based access policies to the remote desktop protocol messages.

Once the user takes control of virtual machine 235, the user can use remotely controlled virtual machine 235 to make network connections to other hosts in network 200, such as web server 240. Absent the techniques described herein, firewall 260 may not be able to apply role based access control to the network traffic generated from virtual machine 235 because the network traffic will appear to be originated from virtual machine 235 instead of the outside user device 220. For example, the messages sent from virtual machine 235 to web server 240 through firewall 260 will not be sent according to the remote desktop protocol, as illustrated by the dashed line connecting virtual machine 235, firewall 260 and web server 240. Because these messages are not sent according to the remote desktop protocol, the identity of the user controlling user device 220 may not be included in the messages, and firewall 260 will not be able to apply role-based policies written for the user or user group controlling user device 220. In other words, once the user accesses virtual machine 235 there is no association between the identity of virtual machine 235 and the identity of the end user or user group controlling it.

In order to prevent possible malicious attacks from an "indirect" path, ACG 215 distributes user mapping 270 to firewall 260. Mapping 270 serves as an indication to firewall 260 that the user of user device 220 is also associated with virtual machine 235. Because the distribution of mapping 270 is performed by ACG 215, role-based access to shared resources can be implemented and managed from a central location for more than one particular type of virtual machine, and independent from virtual machine 235.

Virtual machine 235 may be one of a pool of virtual machines, as opposed to a single remote desktop server. The virtual machines within the pool are available for use by a group of users and new virtual machines are dynamically created and deleted as needed. Therefore, virtual machine 235 may be uniquely associated with the user accessing virtual machine 235 via user device 220, or the user group or role to which the user belongs. Accordingly, the user can be uniquely mapped to virtual machine 235. This allows for a unique mapping between a particular instance of virtual machine 235 and a user, user group or role. Accordingly, user mapping 270 allows firewall 260 to appropriately apply polices to traffic sent from virtual machine 235 without any particular configuration to virtual machine 235. On the other hand, if virtual machine 235 is relied upon to identify the user, user group or role accessing it, each type of virtual machine 235 would need to be configured to provide this service. By implementing role-based access to shared resources at ACG 215, or another form or access point such as a wireless access point, role-based access to shared resources can be implemented regardless of the type of virtual machine that the user is accessing through user device 220 and regardless of whether or not virtual machine 235 is capable of tagging its communications with the user that serves as the ultimate source of, for example, an access request.

Furthermore, because the user of user device 220 has been uniquely mapped to virtual machine 235, and this mapping has been distributed throughout the network 200 via mapping 270, the services provided to the user by virtual machine 235 can be unrestrained. In other words, all of the services available to a user, such as telnet services, web browser services, video player services, and other applications that could be run through a virtual desktop virtual machine, can be available to the user. Nevertheless, role-based access to traffic initiated by these services can be applied based on user mapping 270 and polices applied at firewall 260.

Figure 3:
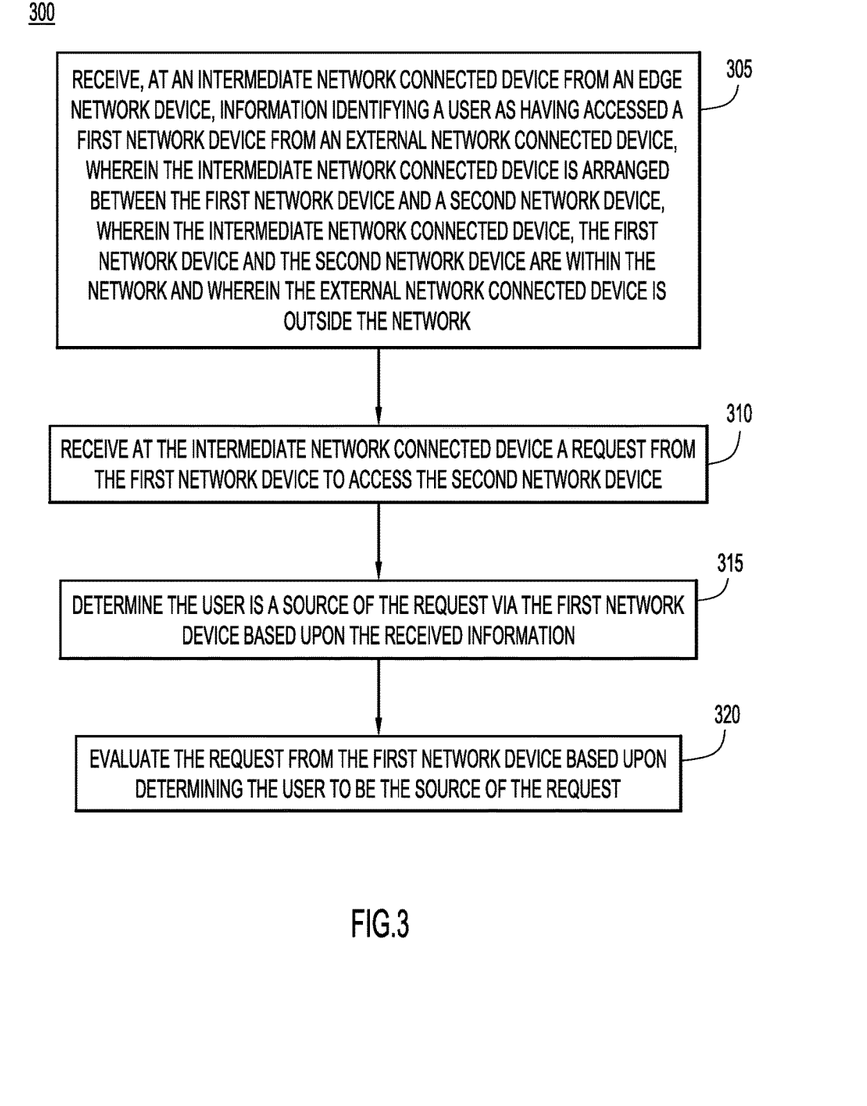
FIG. 3 is a flowchart illustrating a process for performing role-based access for shared resources, according to an example embodiment.

With reference now made to FIG. 3, depicted therein is a flowchart 300 illustrating a process for providing role-based access to shared resources. At 305, information is received at an intermediate network connected device from an edge network device. The information identifies a user as having accessed a first network device from an external network connected device, and the intermediate network connected device is arranged between the first network device and a second network device. The intermediate network connected device, the first network device and the second network device are within the network and the external network connected device is outside the network. The information received at the intermediate network device may be a user to device mapping like mapping 170 of FIG. 1 or mapping 270 of FIG. 2. The intermediate device may be a switch, a router, a firewall, or another network connected device that may be configured to implement security policies and/or access policies, as illustrated in FIGS. 1 and 2 by devices 160 and 260, respectively. The edge network device may be an ACG, a wireless access point, or another form of edge network device through which devices outside of the network are able to access the contents of the network. The first network device and/or the second network device may be embodied as virtual machines. In particular, the first network device may be embodied as a remote desktop virtual machine.

In 310, a request from the first network device to access the second network device is received at the intermediate device. In 315 a determination is made that the source of the request made in 310 is the user associated with external network connected device. This determination is based on the information received in 305 that identifies the user as having accessed the first network device.

In 320, the request is evaluated based upon determining the user is the source of the request. For example, the intermediate device may store policies, such as policy 155 of FIG. 1, which define access rights based upon a user, a user group, and/or roles. Once it is determined that the user is the source of the request received in 310, the user or role based policies stored at the intermediate device may be applied to the request. If the policies stored at the intermediate device indicate that the user or role associated with the request is permitted to access the second network device, the request will be granted. If, on the other hand, the policies stored at the intermediate device indicate that the user or role associated with the request is not permitted to access the second network device, the request will be denied. Other policies may indicate that the communications between the first network device and the second network device should be inspected or proxied by the intermediate network device. Accordingly, the intermediate network device may begin applying these services to communications between the first network device and the second network device.

Figure 4:
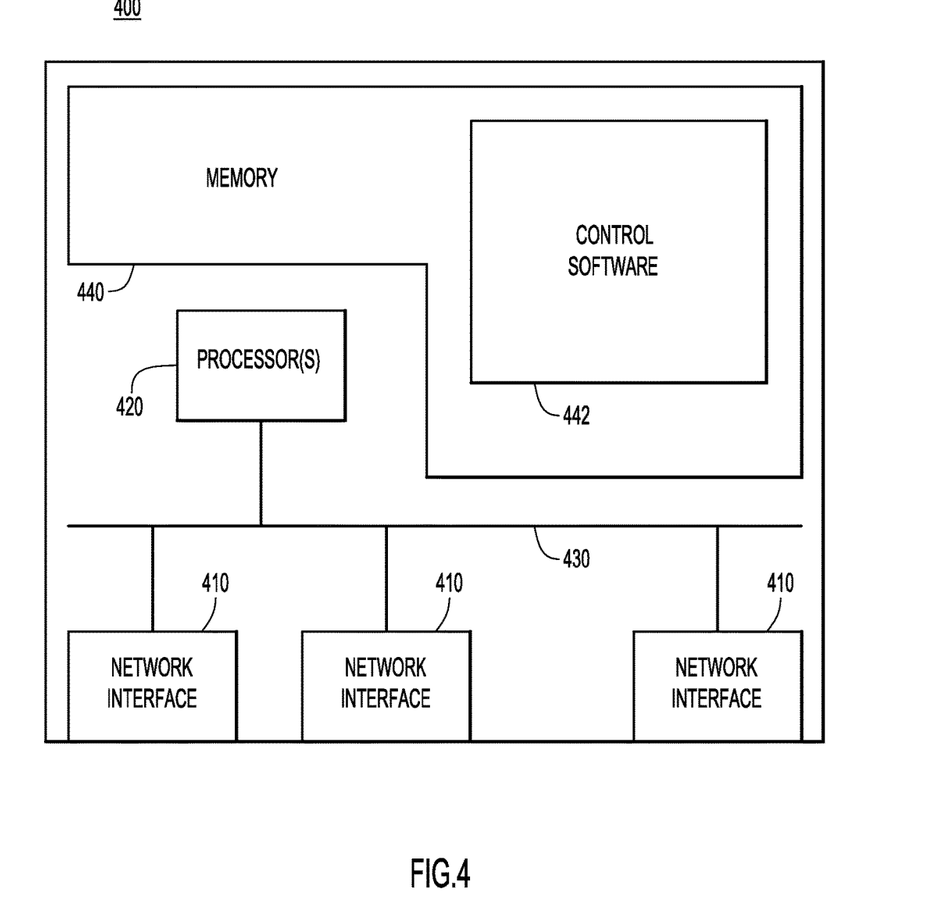
FIG. 4 is a block diagram of a device configured to perform role-based access for shared resources, according to an example embodiment.

With reference now made to FIG. 4, an example block diagram is shown of a device 400, and device 400 may be any one of a network access point, such as an ACG or a wireless access points, or an intermediate network device, such as a switch, a router, a firewall, or another network connected device that may be configured to implement security policies and/or access policies, described above with reference to FIGS. 1-3. Accordingly, device 400 is configured to perform the techniques described herein. Device 400 includes network interfaces (e.g., network ports) 410 which may be used to receive and send packets over a network. The network interfaces 410 may be included as part of a network interface unit (e.g., a network interface card). Accordingly, network interfaces 410 may be embodied as a wired interface, a wireless interfaces, an optical interface, an electrical interface, or a combination thereof. One or more processors 420 are provided to coordinate and control device 400. The processor 420 is, for example, one or more microprocessors or microcontrollers, and it communicates with the network interfaces 410 via bus 430. Memory 440 stores software instructions 442 which may be executed by the processor 420. For example, control software 442 for device 400 includes instructions for performing the role-based access to shared resources described above with reference to FIGS. 1-3. In other words, memory 440 includes instructions for device 400 to carry out the operations described above in connection with FIGS. 1-3. Memory 440 may also store user device mappings, like mappings 170 and 270 from FIGS. 1 and 2, respectively. These mappings may be stored in a database in memory 440, and control software 442 may allow the processor 420 to access the mappings.

Memory 440 may include read only memory (ROM), random access memory (RAM), magnetic disk storage media devices, optical storage media devices, flash memory devices, electrical, optical or other physical/tangible (e.g. non-transitory) memory storage devices. Thus, in general, the memory 440 may be or include one or more tangible (non-transitory) computer readable storage media (e.g., a memory device) encoded with software comprising computer executable instructions. When the instructions of the control software 442 are executed (by the processor 420), the processor is operable to perform the operations described herein in connection with FIGS. 1-3.

In summary, provided herein is a method in which information identifying a user as having accessed a first network device from an external network connected device is received at an intermediate network connected device from an edge network device. The intermediate network connected device is arranged between the first network device and a second network device. The intermediate network connected device, the first network device and the second network device are within a network and the external network connected device is outside the network. A request to access the second network device is received at the intermediate network connected device from the first network device. It is determined that the user is a source of the request via the first network device based upon the received information. The request from the first network device is evaluated based upon determining the user is the source of the request.

Also provided herein is an apparatus comprising a network interface unit and a processor. The processor is configured to receive, via the network interface unit, information identifying a user as having accessed a first network device from an external network connected device. The apparatus is arranged between the first network device and a second network device. The apparatus, the first network device and the second network device are within a network and the external network connected device is outside the network. A request to access the second network device is received at the apparatus from the first network device via the network interface unit. It is determined by the processor that the user is a source of the request via the first network device based upon the received information. The request from the first network device is evaluated by the processor based upon determining the user is the source of the request.

Finally, non-transitory computer readable storage media are provided herein in which instructions encoded on the storage media, when executed by a processor, cause the processor to receive information from an edge network device identifying a user as having accessed a first network device from an external network connected device. The processor executing the instructions may be included in an apparatus that is arranged between the first network device and a second network device. The apparatus that includes the processor executing the instructions, the first network device and the second network device are within a network and the external network connected device is outside the network. The instructions cause the processor to receive a request to access the second network device from the first network device. The instructions cause the processor to determine that the user is a source of the request via the first network device based upon the received information. The instructions cause the process to evaluate the request from the first network device based upon the determination that the user is the source of the request.

Accordingly, the techniques provided herein allow for an association between a user identity and a device identity that is distributed across network components so that role based access control can be enforced at any point of the network. Role-based access can be applied to scenarios where a user may hide its identity by remotely controlling a device behind an ACG. The techniques described herein address security issues particularly useful as access to networks through virtual desktop infrastructures and bring your own device infrastructures become increasingly popular. The techniques described herein provide a built-in solution into the network components and their communication.

The techniques described herein can be specifically applied to scenarios in which an end user is admitted to a corporate network through an ACG (or another access point, such as a wireless access point). User identity may be obtained by the access device, and access control can be put into place based on various conditions including the user identity and user group they belong to. Role-based security can be applied to users without requiring devices inside the access point to tag packets as having originated from the user. Furthermore, in cases where the end user remotely controls a virtual machine, and the network traffic will appear to be originated from the virtual machine instead of the end user, the techniques described herein allow role-based security to be applied based on the user of the virtual machine.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   receiving, at an intermediate network connected device from an edge network device, information identifying a user as having accessed a first network device from an external network connected device via the edge network device, wherein the intermediate network connected device is arranged within a network between the first network device and a second network device, wherein the intermediate network connected device, the first network device and the second network device are within the network, wherein the external network connected device is outside the network, wherein the edge network device applies one or more policies defining access rights to the first network device at a network edge, and wherein the information identifying the user as having accessed the first network device includes a mapping of the user to the first network device and a policy of the one or more policies defining a level of access to the second network device for the user;
   receiving at the intermediate network connected device a request from the first network device to access the second network device, wherein the request is received from the first network device in response to access by the user of the first network device via the external network device;
   determining, from the information at the intermediate network connected device, the user is a source of the request via the first network device from the mapping of the user to the first network device; and
   applying, at the intermediate network connected device, one or more policies defining access rights to the second network device to the request from the first network device based upon determining the user to be the source of the request, wherein applying the one or more policies comprises determining a level of access to the second network device for the user from the policy, and providing the level of access to the first network device.

2. The method of claim 1, wherein applying the one or more policies comprises granting the request.

3. The method of claim 1, wherein applying the one or more policies comprises denying the request.

4. The method of claim 1, wherein the information identifying the user as having accessed the first network device is contained in a message sent from an access control gateway, wherein the access control gateway is within the network.

5. The method of claim 1, wherein the information identifying the user as having accessed the first network device is contained in a message sent from a wireless access point.

6. The method of claim 1, wherein receiving, at the intermediate network connected device from the edge network device, information identifying the user as having accessed the first network device from the external network connected device comprises receiving the information at one of a switch, a router or a firewall.

7. The method of claim 1, wherein the information identifying the user as having accessed the first network device includes information identifying the user as having accessed a virtual desktop virtual machine.

8. The method of claim 1, wherein the first network device comprises a first virtual machine.

9. The method of claim 8, wherein the second network device comprises a second virtual machine.

10. An apparatus comprising:
a network interface unit configured to enable communication over a network;
a memory; and
a processor coupled to the network interface unit, wherein the processor is configured to:
receive, via the network interface unit from a n edge network device, information identifying a user as having accessed a first network device from an external network connected device via the edge network device, wherein the apparatus is arranged within the network between the first network device and a second network device, wherein the apparatus, the first network device and the second network device are within the network, wherein the external network connected device is outside the network, wherein the edge network device applies one or more policies defining access rights to the first network device at a network edge, and wherein the information identifying the user as having accessed the first network device includes a mapping of the user to the first network device and a policy of the one or more policies defining a level of access to the second network device for the user;
receive, via the network interface unit, a request from the first network device to access the second network device, wherein the request is received from the first network device in response to access by the user of the first network device via the external network device;
determine the user is a source of the request via the first network device from the mapping of the user to the first network device; and
apply one or more policies defining access rights to the second network device to the request from the first network device based upon determining the user is the source of the request, wherein the processor is configured to apply the one or more policies by determining a level of access to the second network device for the user from the policy and providing the level of access to the first network device.

11. The apparatus of claim 10, wherein the first network device comprises a first virtual machine.

12. The apparatus of claim 11, wherein the second network device comprises a second virtual machine.

13. The apparatus of claim 10, wherein the processor is configured to receive the information identifying the user as having accessed the first network device by receiving a message sent from an access control gateway.

14. The apparatus of claim 10, wherein the processor is configured to receive the information identifying the user as having accessed the first network device by receiving a mapping of the user to the first network device, and a policy of the one or more policies defining a level of access to the second network device for the user.

15. The apparatus of claim 10, wherein the processor is configured to apply the one or more policies by denying the request.

16. A non-transitory computer readable storage media encoded with instructions, wherein the instructions, when executed by a processor, cause the processor to:
receive information, from an edge network device, identifying a user as having accessed a first network device from an external network connected device, wherein the processor is included in an apparatus that is arranged within a network between the first network device and a second network device, wherein the apparatus, the first network device and the second network device are within the network, wherein the external network connected device is outside the network and accesses the first network device via the edge network device, wherein the edge network device applies one or more policies defining access rights to the first network device at a network edge, and wherein the information identifying the user as having accessed the first network device includes a mapping of the user to the first network device and a policy of the one or more policies defining a level of access to the second network device for the user;
receive a request from the first network device to access the second network device, wherein the request is received from the first network device in response to access by the user of the first network device via the external network device;
determine the user is a source of the request via the first network device from the mapping of the user to the first network device; and
apply one or more policies defining access rights to the second network device to the request from the first network device based upon determining the user is the source of the request, wherein the instructions that cause the processor to apply the one or more policies cause the processor to apply the one or more policies by determining a level of access to the second network device for the user from the policy and providing the level of access to the first network device.

17. The non-transitory computer readable storage media of claim 16, wherein the first network device comprises a first virtual machine.

18. The non-transitory computer readable storage media of claim 16, wherein the instructions that cause the processor to receive the information identifying the user as having accessed the first network device further cause the processor to receive a message sent from an access control gateway.

19. The non-transitory computer readable storage media of claim 16, wherein the instructions that cause the processor to receive the information identifying the user as having accessed the first network device further cause the processor to receive a mapping of the user to the first network device, and a policy of the one or more policies defining a level of access to the second network device for the user.

20. The non-transitory computer readable storage media of claim 16, wherein the instructions that cause the processor to apply the one or more policies cause the processor to apply the one or more policies by denying the request.

* * * * *

UNITED STATES PATENT AND TRADEMARK OFFICE
CERTIFICATE OF CORRECTION

PATENT NO. : 10,277,713 B2
APPLICATION NO. : 14/798863
DATED : April 30, 2019
INVENTOR(S) : Mark Ka Yau Ng et al.

Page 1 of 1

It is certified that error appears in the above-identified patent and that said Letters Patent is hereby corrected as shown below:

In the Claims

Claim 10, Column 9, Line 19, please replace "form a n edge" with --from an edge--

Signed and Sealed this
Eighteenth Day of June, 2019

Andrei Iancu
*Director of the United States Patent and Trademark Office*